(12) United States Patent
Ulasen et al.

(10) Patent No.: US 12,080,054 B2
(45) Date of Patent: Sep. 3, 2024

(54) SYSTEMS AND METHODS FOR DETECTING SMALL OBJECTS IN AN IMAGE USING A NEURAL NETWORK

(71) Applicant: Acronis International GmbH, Schaffhausen (CH)

(72) Inventors: Sergey Ulasen, Moscow (RU); Vasyl Shandyba, Dnipro (UA); Alexander Snorkin, Moscow (RU); Artem Shapiro, Dnipro (UA); Andrey Adaschik, Moscow (RU); Serguei Beloussov, Costa del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 359 days.

(21) Appl. No.: 17/689,403

(22) Filed: Mar. 8, 2022

(65) Prior Publication Data

US 2022/0292817 A1 Sep. 15, 2022

Related U.S. Application Data

(60) Provisional application No. 63/159,204, filed on Mar. 10, 2021.

(51) Int. Cl.
*G06V 10/82* (2022.01)
*G06N 3/045* (2023.01)
*G06V 10/764* (2022.01)
*G06V 20/40* (2022.01)

(52) U.S. Cl.
CPC ............. *G06V 10/82* (2022.01); *G06N 3/045* (2023.01); *G06V 10/764* (2022.01); *G06V 20/42* (2022.01)

(58) Field of Classification Search
CPC ...... G06V 10/82; G06V 20/42; G06V 10/764; G06N 3/045
See application file for complete search history.

(56) References Cited

U.S. PATENT DOCUMENTS

2020/0090004 A1* 3/2020 Takeyasu ............. G06V 20/582
2020/0184336 A1* 6/2020 Cao ........................ G06F 18/214

* cited by examiner

*Primary Examiner* — Kenny A Cese
(74) *Attorney, Agent, or Firm* — ArentFox Schiff LLP; Michael Fainberg

(57) ABSTRACT

Disclosed herein are systems and method for detecting small objects in an image using a neural network (NN). An exemplary method may include: receiving a first NN that is trained on a dataset including a plurality of images depicting various objects; identifying a first structure of the first NN, the first structure indicative of each layer and layer size in the first NN; determining, based on the first structure, whether the first NN can classify an object less than a threshold size in an input image; in response to determining that the first NN cannot classify the object, identifying a subset of detection layers in the first NN; generating and training a second NN that has a second structure in which the subset of detection layers are replaced by at least one layer not in the subset; and receiving, from the second NN, a classification of the object.

20 Claims, 4 Drawing Sheets

SYSTEMS AND METHODS FOR DETECTING SMALL OBJECTS IN AN IMAGE USING A NEURAL NETWORK

CROSS-REFERENCE TO RELATED APPLICATIONS

This application claims the benefit of U.S. Provisional Application No. 63/159,204, filed Mar. 10, 2021, which is herein incorporated by reference.

FIELD OF TECHNOLOGY

The present disclosure relates to the field of computer vision, and, more specifically, to systems and methods for detecting small objects in an image using a neural network.

BACKGROUND

Conventional neural network-based object detectors have issues with small object detection. For example, in a 512×512 pixel image, an object with a size bounded by 2×2 pixels may be undetectable because it is too small. In general, only big neural network models can recognize small objects, but they are very far from real-time performance. This makes them inapplicable in real life, such as in sportscasts where player, ball, and field identification is needed from a far camera view. Thus, there is a need for building a fast detector that is able to detect small objects, dramatically reduce computational resources, and make optical detection applicable when real-time detection is required.

SUMMARY

Aspects of the disclosure relate to the field of computer vision. In particular, aspects of the disclosure describe methods and systems for detecting small objects in an image using a neural network In one exemplary aspect, the techniques described herein relate to a method for detecting small objects in an image using a neural network, the method including: receiving a first neural network that is trained on a dataset including a plurality of images depicting various objects; identifying a first structure of the first neural network, the first structure indicative of each layer and layer size in the first neural network; determining, based on the first structure, whether the first neural network can classify an object less than a threshold size in an input image; in response to determining that the first neural network cannot classify the object, identifying a subset of detection layers in the first neural network; generating a second neural network that has a second structure in which the subset of detection layers are replaced by at least one layer not in the subset; training the second neural network with the dataset; and receiving, from the second neural network, a classification of the object less than the threshold size in the input image.

In some aspects, the techniques described herein relate to a method, further including: determining whether the classification received from the second neural network is correct; and in response to determining that the classification is incorrect, retraining the second neural network with an updated dataset.

In some aspects, the techniques described herein relate to a method, wherein determining, based on the first structure, whether the first neural network can classify the object less than the threshold size in the input image further includes: inputting the input image in the first neural network; and receiving an incorrect classification of the object from the first neural network.

In some aspects, the techniques described herein relate to a method, wherein the first neural network is configured to output a boundary around classified objects, and wherein determining, based on the first structure, whether the first neural network can classify the object less than the threshold size in the input image further includes: inputting the input image in the first neural network; receiving a boundary output from the first neural network; and determining that the boundary output does not match an expected boundary output of the object.

In some aspects, the techniques described herein relate to a method, wherein the first neural network is a convolutional neural network.

In some aspects, the techniques described herein relate to a method, wherein the input image is a frame of a real-time video stream depicting multiple objects less than the threshold size.

In some aspects, the techniques described herein relate to a method, wherein the multiple objects include a ball and humans against a semi-uniform background.

In some aspects, the techniques described herein relate to a method, wherein identifying the subset of detection layers further includes: for each respective layer in the first structure, determining a respective object size when an input passes through the respective layer; comparing the respective object size with a global threshold size; and in response to determining that the respective object size is less than the global threshold size, identifying the respective layer as part of the subset of detection layers.

It should be noted that the methods described above may be implemented in a system comprising a hardware processor. Alternatively, the methods may be implemented using computer executable instructions of a non-transitory computer readable medium.

In some aspects, the techniques described herein relate to a system for detecting small objects in an image using a neural network, the system including: a memory; and a hardware processor communicatively coupled with the memory and configured to: receive a first neural network that is trained on a dataset including a plurality of images depicting various objects; identify a first structure of the first neural network, the first structure indicative of each layer and layer size in the first neural network; determine, based on the first structure, whether the first neural network can classify an object less than a threshold size in an input image; in response to determining that the first neural network cannot classify the object, identify a subset of detection layers in the first neural network; generate a second neural network that has a second structure in which the subset of detection layers are replaced by at least one layer not in the subset; train the second neural network with the dataset; and receive, from the second neural network, a classification of the object less than the threshold size in the input image.

In some aspects, the techniques described herein relate to a non-transitory computer readable medium storing thereon computer executable instructions for detecting small objects in an image using a neural network, including instructions for: receiving a first neural network that is trained on a dataset including a plurality of images depicting various objects; identifying a first structure of the first neural network, the first structure indicative of each layer and layer size in the first neural network; determining, based on the first structure, whether the first neural network can classify an object less than a threshold size in an input image; in response to determining that the first neural network cannot classify the object, identifying a subset of detection layers in the first neural network; generating a second neural network that has a second structure in which the subset of detection layers are replaced by at least one layer not in the subset; training the second neural network with the dataset; and receiving, from the second neural network, a classification of the object less than the threshold size in the input image.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for detecting small objects in an image using a neural network. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In order to address the shortcomings described in the background section of the present disclosure, systems and methods are presented for small object detection using a neural network. In particular, the present disclosure describes changing the detection layers to the earlier layers in a features pyramid of a neural network. The earlier layers have a bigger resolution, thus enabling to detect smaller objects. It should be noted, the earlier layers generally provide less complex object representations and therefore, this method gives good results mostly for relatively simple objects and environments (e.g., a person or ball on a green background). It should also be noted that although the example of soccer is prominently described, the application area can be extended to similar sports such as basketball, rugby, etc., and any non-sports areas where the environment is relatively simple and real-time small object detection is required.

Figure 1:
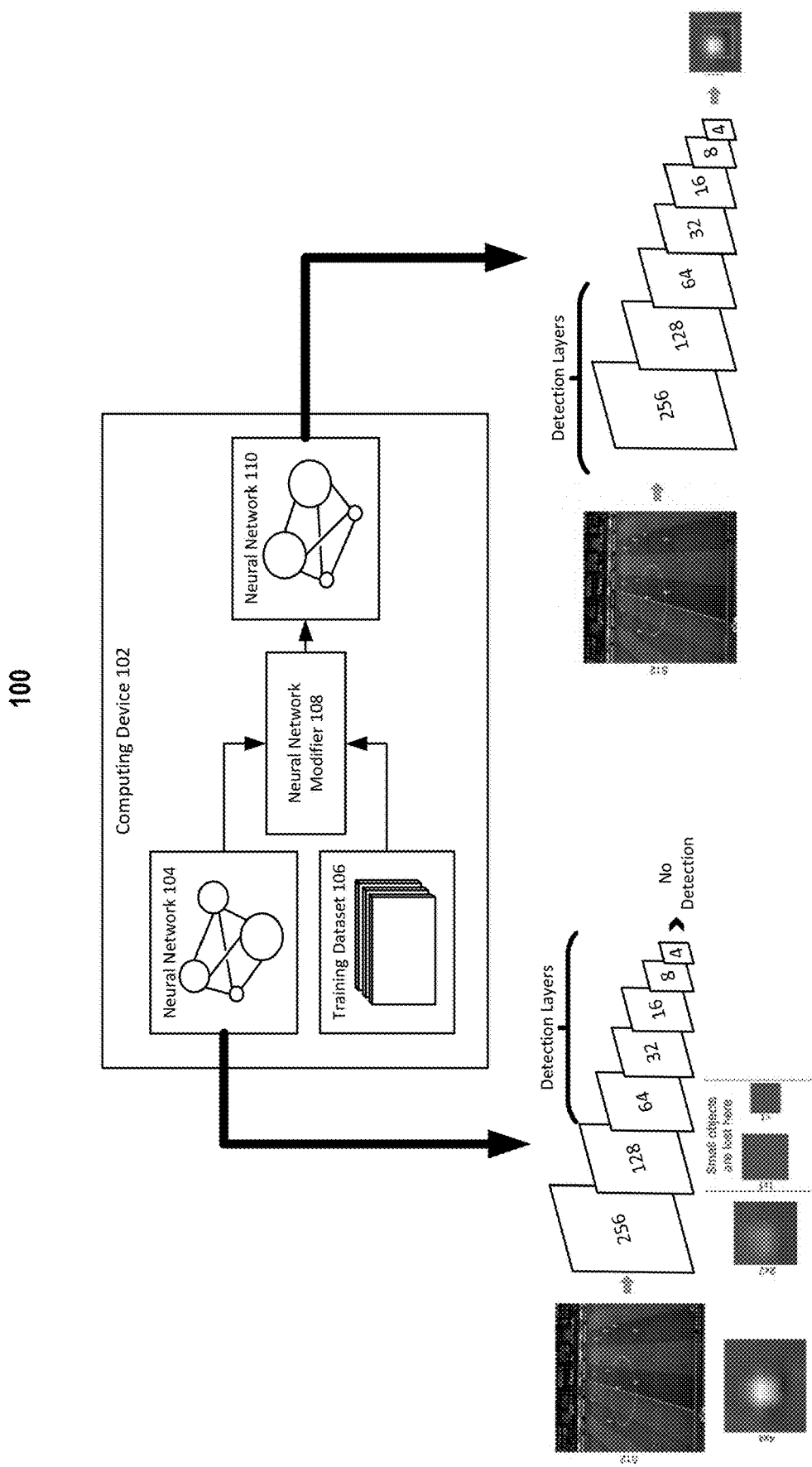
FIG. 1 is a block diagram illustrating a system for detecting small objects in an image using a neural network.

FIG. 1 is a block diagram illustrating system 100 for detecting small objects in an image using a neural network. In an exemplary aspect, system 100 includes a computing device 102 that stores neural network 104 and training dataset 106 in memory. Neural network 104 may be an image classifier that identifies an object in an image and outputs a label. Neural network 104 may also be an object detector that identifies an object in an image and generates a boundary around the object.

In some aspects, neural network 104 and training dataset 106 may be stored on a different device than computing device 102. Computing device 102 may be a computer system (described in FIG. 4) such as a server. If neural network 104 and/or training dataset 106 are stored on a different device, computing device 102 may communicate with the different device to acquire information about the structure of neural network 104, code of neural network 104, images in training dataset 106, etc. This communication may take place over a network (e.g., the Internet).

Neural network modifier 108 is software module that is configured to enhance the small object detection capabilities of a neural network. As discussed before, neural networks are generally better at classifying large and prominent objects in images. Consider an example in which the input image is a frame of a real-time video stream depicting multiple objects less than the threshold size. This video steam may be of a soccer match and the multiple objects may include a soccer ball and humans (e.g., players, coaches, staff, fans, etc.). As shown in FIG. 1, the image may be a far-view of the soccer field. Accordingly, relative to the size of the entire frame, the ball and the players are small. More technically, the size of these objects may be less than a threshold size. The threshold size may be expressed as a percentage of pixels, a number of pixels, a boundary with specific dimensions, etc. For example, the frame may be 512×512 pixels and the threshold size may be predetermined (e.g., by a developer of neural network modifier 108, an administrator of computing device 102, a user of neural network 104, etc.) at 12 pixels (e.g., 2×6, 6×2, 3×4, etc.). Accordingly, any object less than this size may be considered a small object.

Conventionally, these small objects are only detected when the input images are made larger. However, this makes the computational and memory load of a neural network large enough that they are ineffective when being used for real-time image classification (e.g., detecting players in a live soccer match). Thus, neural network modifier 108 is configured to restructure an existing neural network to improve its detection capabilities without adjusting input image size.

In an exemplary aspect, neural network modifier 108 receives neural network 104 that is trained on dataset 106 comprising a plurality of images depicting various objects. In some aspects, neural network 104 may be a convolutional neural network. Neural network modifier 108 then identifies a first structure of the first neural network, wherein the first structure is indicative of each layer and layer size in neural network 104. The structure may also specify the type of each layer (e.g., convolutional, pooling, rectified linear unit (ReLU), etc.). In FIG. 1, the structure of neural network 104 shows 7 layers. An input image of 512×512 pixels enters neural network 104 and adjusts in size (e.g., 256×256 pixels in layer 1, 128×128 pixels in layer 2, etc.).

Neural network modifier 108 then determines, based on the first structure, whether neural network 104 can classify an object less than a threshold size in an input image. Suppose that the threshold size is 4×4 pixels. If a soccer ball is originally bounded within a 4×4 pixel square, as shown in FIG. 1, by the third layer of neural network 104, the soccer ball feature is lost and no longer detectable. In some aspects, neural network modifier 108 may determine whether the small object is classifiable by inputting the input image depicting the small object and verifying an output of neural network 104. For example, neural network modifier 108 may input the input image of the soccer field in neural network 104 and receive an incorrect classification of the object from neural network 104 (e.g., network 104 either outputs an error, misclassifies by saying the output is "soccer field," etc.). In another example, where neural network 104 is configured to output a boundary around classified objects (e.g., a region-convolutional neural network (R-CNN)), neural network modifier 108 may input the input image in neural network 104, receive a boundary output (e.g., a location and a dimension such as (300, 300, 100, 50), which indicates that the object is centered at pixel (300, 300) and is bound by a 100×50 frame), and determine that the boundary output does not match an expected boundary output of the object. For example, the boundary output of the soccer ball may be (350, 400, 3, 3).

In response to determining that neural network 104 cannot classify the object, neural network modifier 108 identifies a subset of detection layers in neural network 104. These detection layers are visually marked in FIG. 1. The detection layers of a neural network tend to be near the front of the neural network (i.e., closer to the output layer) and have a bigger resolution than the layers near the back of the neural network. Because the resolution is bigger, small objects are not lost if the layers are shifted to the back of the neural network. This is discussed in greater detail in the description of FIG. 2.

Neural network modifier 108 subsequently generates neural network 110 that has a second structure in which the subset of detection layers are replaced by at least one layer not in the subset. For example, neural network modifier 108 may receive the source code associated with neural network 104 and metadata indicating layer information (e.g., the amount of layers, the number of neurons per layer, the functionality of each layer, an identifier of the layer (e.g., "conv6," "conv7," etc.). Neural network modifier 108 may identify the code that is associated with the subset of detection layers and replace/modify the code such that it includes code for the at least one layer not in the subset. Suppose that the source code is organized in a plurality of functions, where each function represents a layer. If there are six layers (L1, L2, L3, L4, L5, and L6), each function is programmed to receive a vector of a first size and output a vector of a second size. If layers L3-L6 are to be replaced by, for example, L_replace, neural network modifier 108 generates the code for L_replace such that the code accepts the output vector from L2 and generates its own output vector that can be used to classify the object. Here, L_replace may be a copy of L1, L2, and a classification layer (e.g., that determines if an object is a ball or not). In some aspects, neural network modifier 108 generates the code for L_replace using language engineering techniques (e.g., automated code generation).

This is visually depicted in FIG. 1, where the first two layers of neural network 110 (e.g., a Single Shot Multi-box Detector (SSD)) are identified as possible replacements for the original detection layers. It should be noted that there are originally five detection layers in neural network 104 and are replaced with two detection layers. The replaced detection layers (e.g., convolutional layers) thus generate feature maps that have a resolution where objects within the threshold size are detectable. In some aspects, the subset of detection layers may be replaced with fully connected layers that generate a class output. Neural network modifier 108 then trains neural network 110 with dataset 106. In some aspects, neural network modifier 108 trains neural network 110 with a different dataset that comprises more images of smaller objects (e.g., players and balls).

Once neural network 110 is trained, neural network modifier 108 may input the input image in neural network 110 and receive, from neural network 110, a classification of the object (e.g., a soccer ball) less than the threshold size in the input image. Because the size and structure of neural network 104 is not significantly changed aside from shifting a subset of detection layers, there is no significant change in computational time and intensity. The modification of neural network 104 enhances the resolution of small features, which is why neural network 110 can classify small objects. As mentioned, because the objects are small, neural network 110 works best when the background that the small objects are against is semi-uniform. A semi-uniform background is one in which at least a threshold amount of pixels (e.g., 75%) not part of the object have the same color. For example, players against a soccer field will still stand out because the field has mostly the same color and is not busy. If the objects are players and a ball, the pixels part of the background are those not part of the players or the ball (e.g., pixels part of the soccer pitch, the stands, etc.). In order to achieve more uniformity in a background, neural network modifier 108 may add a pooling layer and an upsampling layer at the back of neural network 110 as a preprocessing measure.

In some aspects, subsequent to receiving the classification from neural network 110, neural network modifier 108 may determine whether the classification received from neural network 110 is correct. In response to determining that the classification is incorrect, neural network modifier 108 may retrain neural network 110 with an updated dataset (e.g., a testing dataset portion of dataset 106 or a different labelled dataset with more small object examples).

Figure 2:
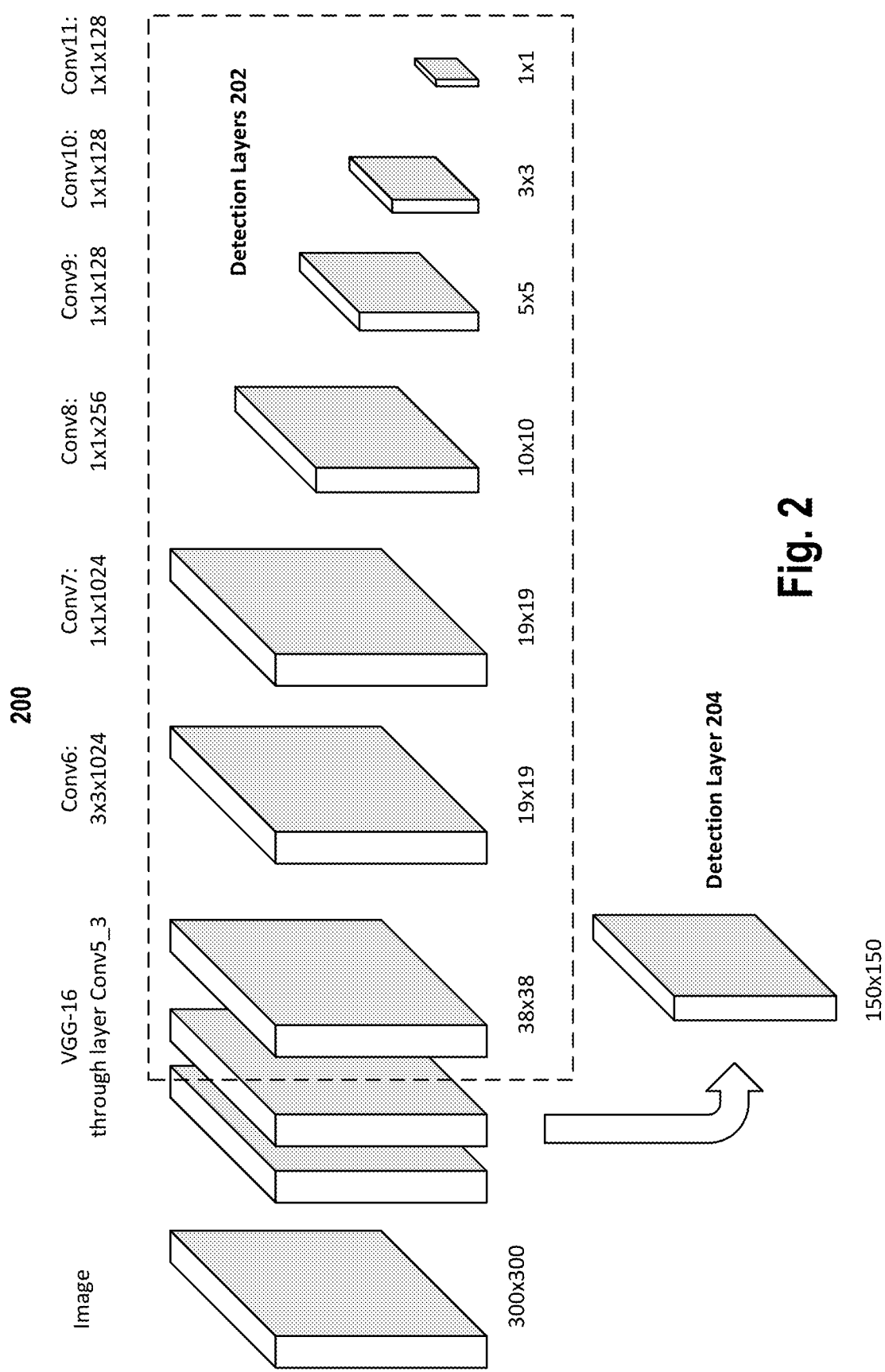
FIG. 2 is a block diagram illustrating a high-level neural network where the detection layers are shifted.

FIG. 2 is a block diagram illustrating example 200 of high-level neural network where the detection layers are shifted. Example 200 displays a high-level depiction of a Single Shot MultiBox Detector (SSD), which is a neural network commonly used for image classification. The SSD structure is based on the venerable VGG-16 architecture (a different image-classifying neural network), but does not include the fully connected layers of the VGG-16. Instead of the fully connected layers, convolutional layers conv6-conv11 are added.

If an input image that is 300×300 pixels in size is passed through the VGG-16 portion of the SSD, the size of the resulting image is 38×38 pixels. After passing through each of the other six convolutional layers of the SSD, the size decreases from 19×19 pixels to 1×1 pixels. In example 200, neural network modifier 108 determines that the subset of detection layers 202 include convolutional layers conv5 to conv11. It should be noted that detection layers 202 are not limited to convolutional layers and may also comprise layer types such as max pooling and ReLU.

In some aspects, neural network modifier 108 determines that a neural network such as the SSD cannot detect small objects based on the structure of the neural network and the resolution of the input image. For example, because the resolution of layer conv5 is 38×38 pixels, objects less than 8 pixels in the original input image will be less than 1×1 pixels. Suppose that the input image is a soccer match view and the size is 300×300 pixels. Here, the size of the ball will be approximately 2×2 pixels. When the output from conv5 is 38×38 pixels, the median size of the ball will be 0.25×0.25 pixels, causing a localization issue for the detector.

Neural network modifier 108 may thus identify the subset of detection layers by determining the smallest size of an object to be detected (e.g., the threshold size). Neural network modifier 108 may then calculate, based on each layer size, a new object size after an image has passed through a layer. For example, an original threshold size of 2×2 pixels becomes 0.25×0.25 pixels after conv5. When the new object size is less than a global threshold size (e.g., 1×1 pixels), neural network modifier 108 identifies that layer and all subsequent layers as part of the subset of detection layers. In some aspects, this global threshold size is specific to the type of neural network and its image classifying capabilities. For example, for the SSD, the global threshold size of 1×2 pixels may be suitable. To identify the global threshold size, neural network modifier 108 may manage a database of known neural networks. For example, the database of known neural networks may include entries that include identifiers of a plurality of image classifying neural networks (e.g., names such as "SSD," "VGG-16," etc.), and the code and a respective global threshold size for each neural network. The database may be updated periodically by neural network modifier 108, which may pull code and metadata (e.g., layer information, neuron information, etc.) from a source (e.g., a code repository).

Neural network modifier 108 then selects layers that are not part of the subset of detection layers as replacement layers. For example, neural network modifier 108 may identify the first convolutional layer of VGG-16 (i.e., conv1) as a replacement detection layer 204. Conv1 has a resolution of 150×150 pixels, and the new object size (e.g., a median ball size) becomes 1×1 pixels after an image has pass through conv1. This allows for the object to be detected. As noted before, the main problem with the earlier layers of a neural network is that they provide very simple image representation, which is why this approach is not suitable for more complex and general image classification datasets like COCO. However, when the objects and environments are simple, this neural network modification approach works well.

In some aspects, there are two outputs for the modified neural network. Referring to FIG. 2, the first output is for regular-sized objects (i.e., objects whose features are not lost when going through detection layers) and is generated using detection layers 202. The second output is for small-sized objects and is generated using detection layer 204. The weights for detection layer 204 are learned for accurate classification of small-sized objects. The weights for detection layers 202 are learned for regular-sized objects. The initial layers not bounded by the boundary box are shared by both detection layer(s). In some aspects, detection layer 204 may be followed by other layers such as an output layer (e.g., max pooling, sigmoid, etc.). In some aspects, detection layer 204 and detection layers 202 share the same output layer(s).

Figure 3:
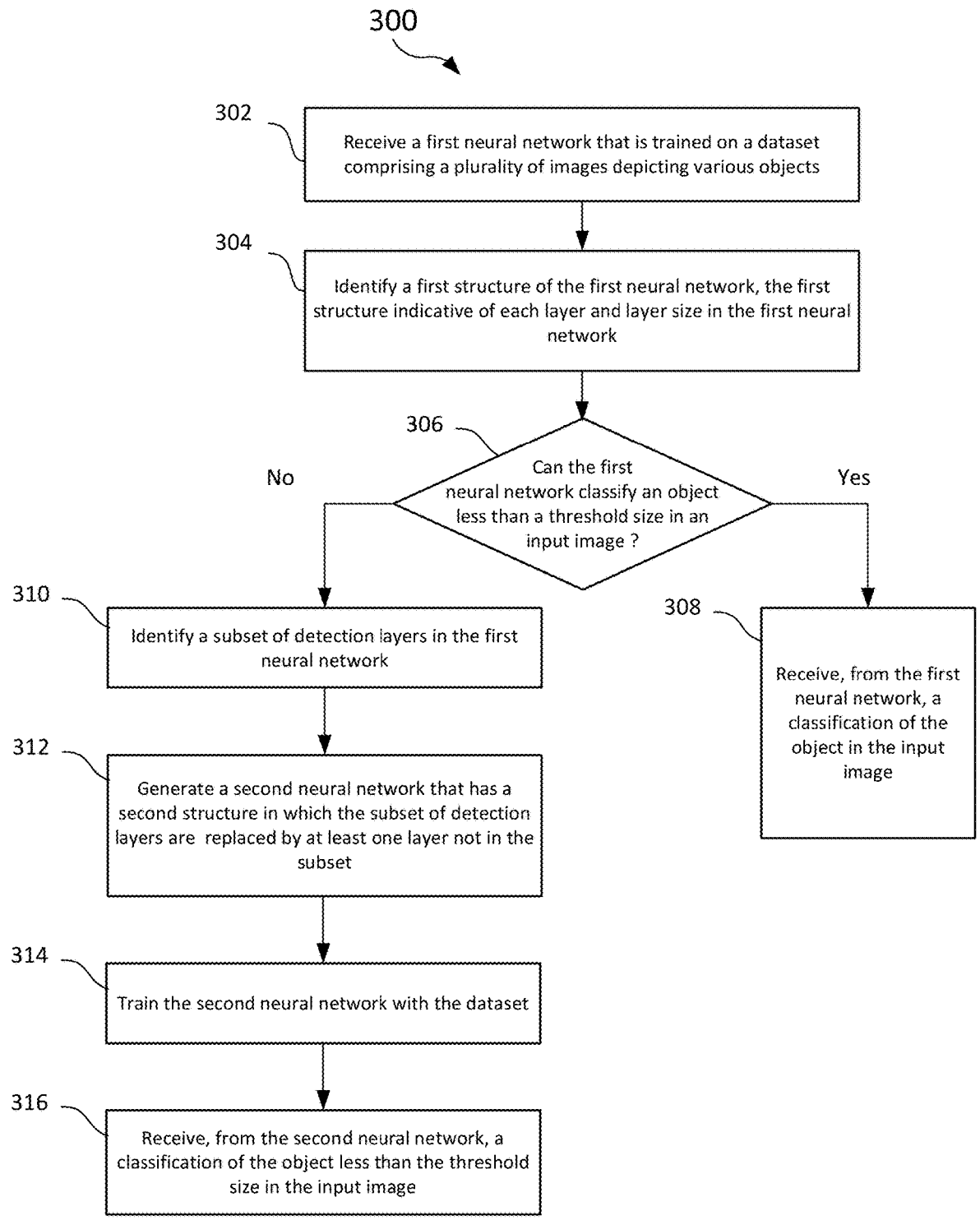
FIG. 3 illustrates a flow diagram of a method for detecting small objects in an image using a neural network.

FIG. 3 illustrates a flow diagram of a method for detecting small objects in an image using a neural network. At 302, neural network modifier 108 receives a first neural network (e.g., neural network 104) that is trained on a dataset (e.g., training dataset 106) comprising a plurality of images depicting various objects. At 304, neural network modifier 108 identifies a first structure of the first neural network (e.g., as displayed in example 200), the first structure indicative of each layer and layer size in the first neural network. At 306, neural network modifier 108 determines, based on the first structure, whether the first neural network can classify an object less than a threshold size in an input image (e.g., a soccer ball in an image of a soccer match).

In response to determining that the first neural network cannot classify the object, method 300 advances to 310, where neural network modifier 108 identifies a subset of detection layers in the first neural network (e.g., layers 202). At 312, neural network modifier 108 generates a second neural network (e.g., neural network 110) that has a second structure in which the subset of detection layers are replaced by at least one layer not in the subset.

At 314, neural network modifier 108 trains the second neural network with the dataset. At 316, neural network modifier 108 receives, from the second neural network, a classification of the object less than the threshold size in the input image. It should be noted that if at 306, neural network modifier 108 determines that the first neural network can classify the object, method 300 instead ends at 308, where neural network modifier 108 receives the classification of the object from the first neural network.

Figure 4:
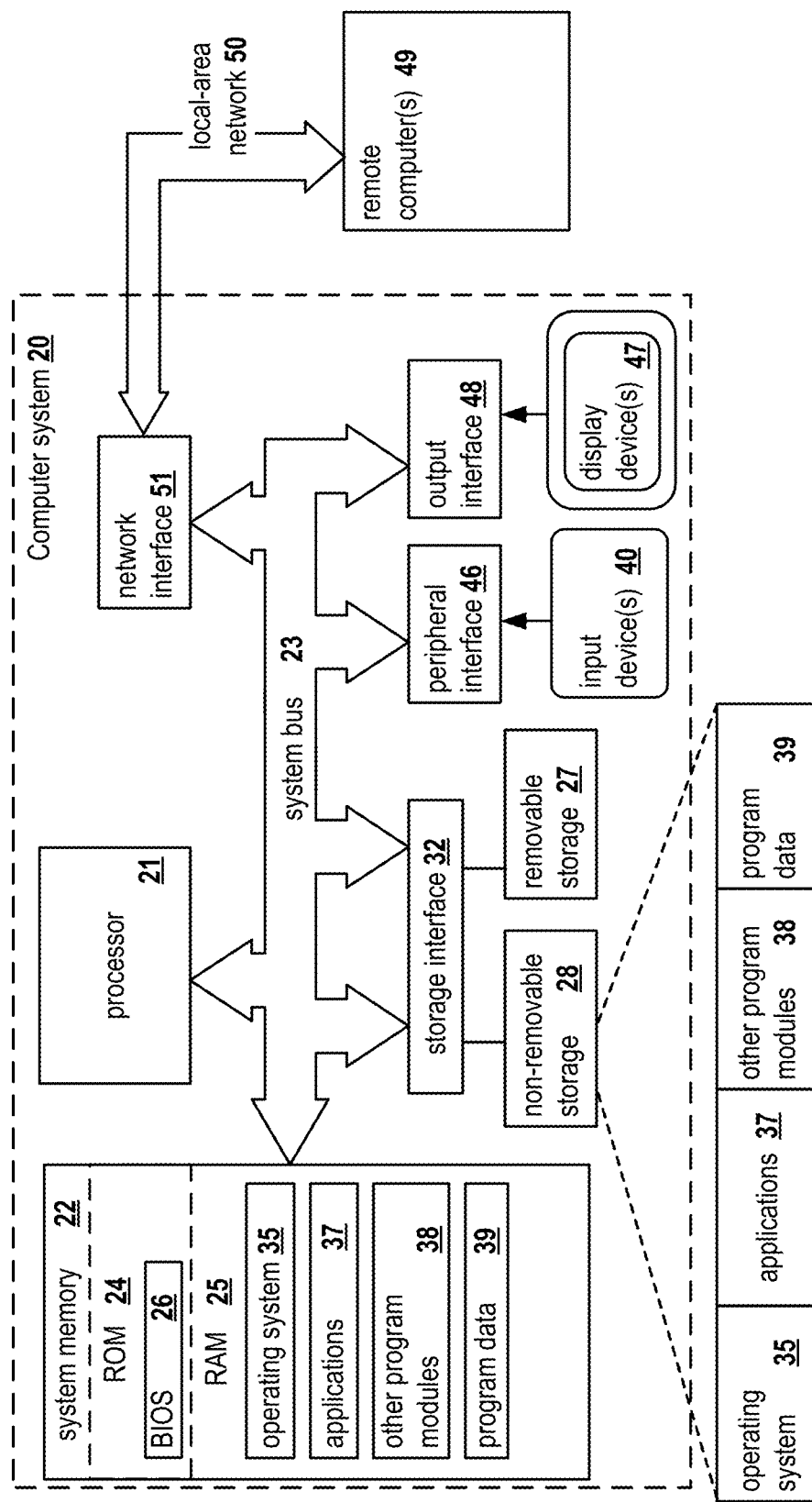
FIG. 4 presents an example of a general-purpose computer system on which aspects of the present disclosure can be implemented.

FIG. 4 is a block diagram illustrating a computer system 20 on which aspects of systems and methods for detecting small objects in an image using a neural network may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting small objects in an image using a neural network, the method comprising:
   receiving a first neural network that is trained on a dataset comprising a plurality of images depicting various objects;
   identifying a first structure of the first neural network, the first structure indicative of each layer and layer size in the first neural network;
   determining, based on the first structure, whether the first neural network can classify an object less than a threshold size in an input image;
   in response to determining that the first neural network cannot classify the object, identifying a subset of detection layers in the first neural network;
   generating a second neural network that has a second structure in which the subset of detection layers are replaced by at least one layer not in the subset;
   training the second neural network with the dataset; and
   receiving, from the second neural network, a classification of the object less than the threshold size in the input image.

2. The method of claim 1, further comprising:
   determining whether the classification received from the second neural network is correct; and
   in response to determining that the classification is incorrect, retraining the second neural network with an updated dataset.

3. The method of claim 1, wherein determining, based on the first structure, whether the first neural network can classify the object less than the threshold size in the input image further comprises:
   inputting the input image in the first neural network; and
   receiving an incorrect classification of the object from the first neural network.

4. The method of claim 1, wherein the first neural network is configured to output a boundary around classified objects, and wherein determining, based on the first structure, whether the first neural network can classify the object less than the threshold size in the input image further comprises:
   inputting the input image in the first neural network;
   receiving a boundary output from the first neural network; and
   determining that the boundary output does not match an expected boundary output of the object.

5. The method of claim 1, wherein the first neural network is a convolutional neural network.

6. The method of claim 1, wherein the input image is a frame of a real-time video stream depicting multiple objects less than the threshold size.

7. The method of claim 6, wherein the multiple objects comprise a ball and humans against a semi-uniform background.

8. The method of claim 1, wherein identifying the subset of detection layers further comprises:
   for each respective layer in the first structure, determining a respective object size when an input passes through the respective layer;
   comparing the respective object size with a global threshold size; and
   in response to determining that the respective object size is less than the global threshold size, identifying the respective layer as part of the subset of detection layers.

9. A system for detecting small objects in an image using a neural network, the system comprising:
   a memory; and
   a hardware processor communicatively coupled with the memory and configured to:
      receive a first neural network that is trained on a dataset comprising a plurality of images depicting various objects;
      identify a first structure of the first neural network, the first structure indicative of each layer and layer size in the first neural network;
      determine, based on the first structure, whether the first neural network can classify an object less than a threshold size in an input image;
      in response to determining that the first neural network cannot classify the object, identify a subset of detection layers in the first neural network;
      generate a second neural network that has a second structure in which the subset of detection layers are replaced by at least one layer not in the subset;
      train the second neural network with the dataset; and
      receive, from the second neural network, a classification of the object less than the threshold size in the input image.

10. The system of claim 9, wherein the hardware processor is further configured to:
    determine whether the classification received from the second neural network is correct; and
    in response to determining that the classification is incorrect, retrain the second neural network with an updated dataset.

11. The system of claim 9, wherein the hardware processor is further configured to determine, based on the first structure, whether the first neural network can classify the object less than the threshold size in the input image by:
    inputting the input image in the first neural network; and
    receiving an incorrect classification of the object from the first neural network.

12. The system of claim 9, wherein the first neural network is configured to output a boundary around classified objects, and wherein the hardware processor is further configured to determine, based on the first structure, whether the first neural network can classify the object less than the threshold size in the input image by:
  inputting the input image in the first neural network;
  receiving a boundary output from the first neural network; and
  determining that the boundary output does not match an expected boundary output of the object.

13. The system of claim 9, wherein the first neural network is a convolutional neural network.

14. The system of claim 9, wherein the input image is a frame of a real-time video stream depicting multiple objects less than the threshold size.

15. The system of claim 14, wherein the multiple objects comprise a ball and humans against a semi-uniform background.

16. The system of claim 9, wherein the hardware processor is further configured to identify the subset of detection layers by:
  for each respective layer in the first structure, determining a respective object size when an input passes through the respective layer;
  comparing the respective object size with a global threshold size; and
  in response to determining that the respective object size is less than the global threshold size, identifying the respective layer as part of the subset of detection layers.

17. A non-transitory computer readable medium storing thereon computer executable instructions for detecting small objects in an image using a neural network, including instructions for:
  receiving a first neural network that is trained on a dataset comprising a plurality of images depicting various objects;
  identifying a first structure of the first neural network, the first structure indicative of each layer and layer size in the first neural network;
  determining, based on the first structure, whether the first neural network can classify an object less than a threshold size in an input image;
  in response to determining that the first neural network cannot classify the object, identifying a subset of detection layers in the first neural network;
  generating a second neural network that has a second structure in which the subset of detection layers are replaced by at least one layer not in the subset;
  training the second neural network with the dataset; and
  receiving, from the second neural network, a classification of the object less than the threshold size in the input image.

18. The non-transitory computer readable medium of claim 17, further comprising instructions for:
  determining whether the classification received from the second neural network is correct; and
  in response to determining that the classification is incorrect, retraining the second neural network with an updated dataset.

19. The non-transitory computer readable medium of claim 17, wherein an instruction for determining, based on the first structure, whether the first neural network can classify the object less than the threshold size in the input image further comprises instructions for:
  inputting the input image in the first neural network; and
  receiving an incorrect classification of the object from the first neural network.

20. The non-transitory computer readable medium of claim 17, wherein the first neural network is configured to output a boundary around classified objects, and wherein an instruction for determining, based on the first structure, whether the first neural network can classify the object less than the threshold size in the input image further comprises instructions for:
  inputting the input image in the first neural network;
  receiving a boundary output from the first neural network; and
  determining that the boundary output does not match an expected boundary output of the object.

* * * * *